Figure 1:
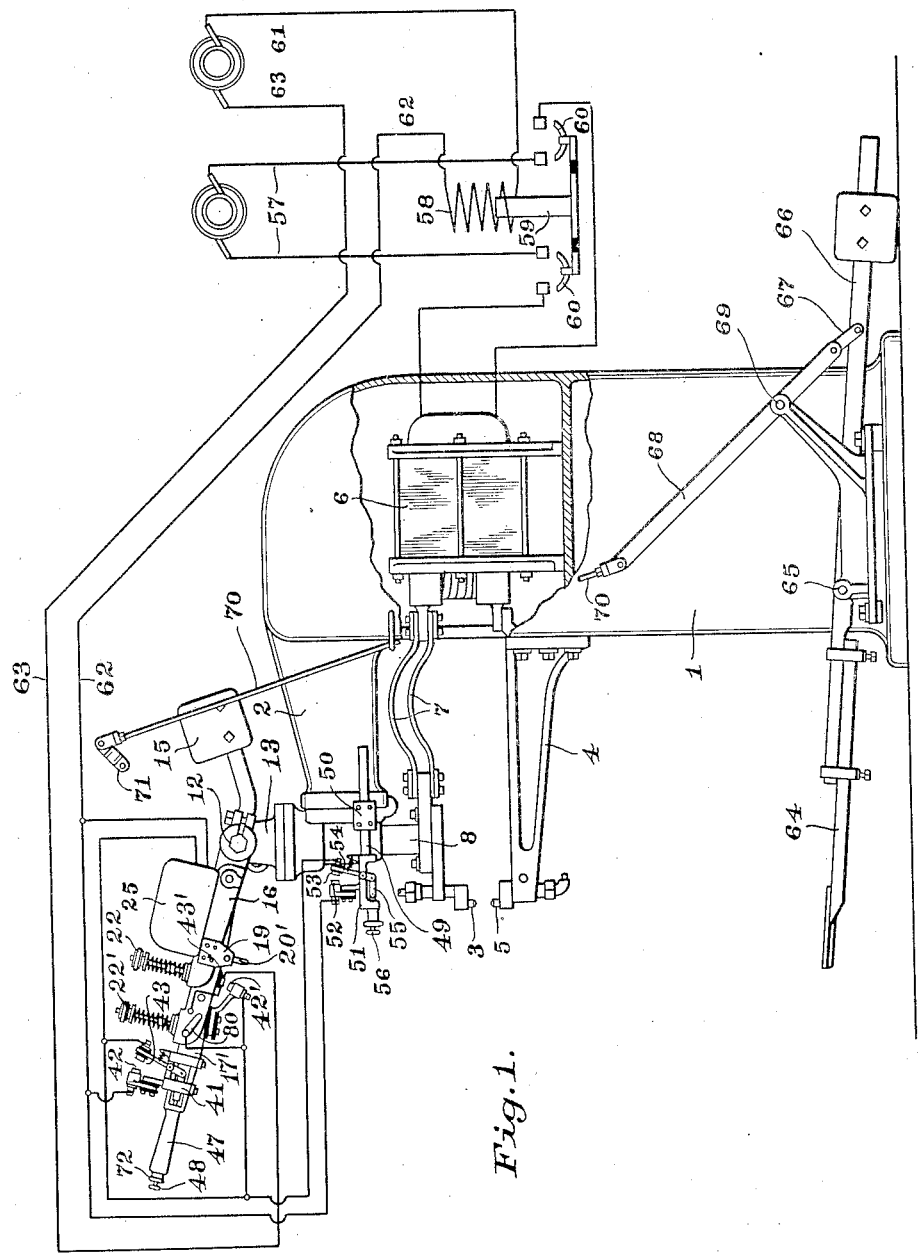

J. A. MUIR.
ELECTRIC WELDING.
APPLICATION FILED APR. 6, 1914.

1,142,833.

Patented June 15, 1915.
2 SHEETS—SHEET 1.

Witnesses:
Joseph D. Connolly Jr.
W. J. Furlong

James A. Muir   Inventor
By his Attorneys
Edwards, Sager & Wooster

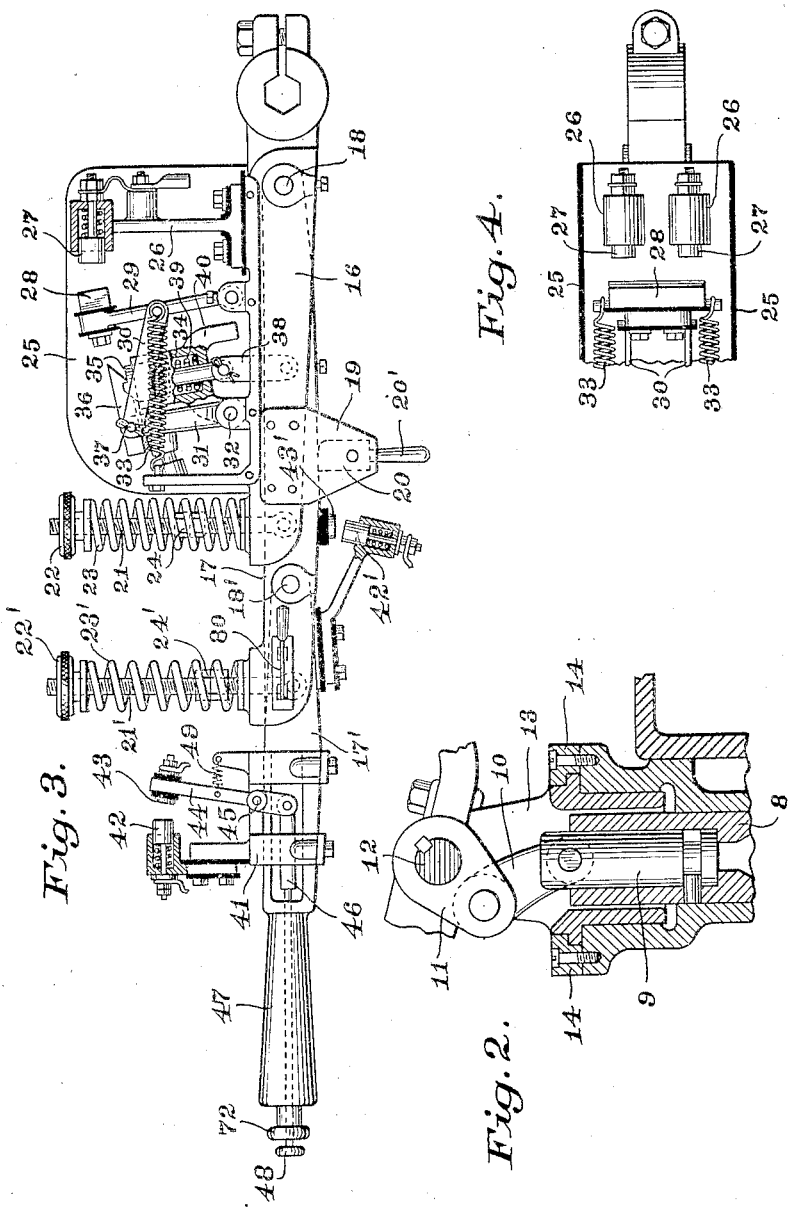

UNITED STATES PATENT OFFICE.

JAMES A. MUIR, OF CINCINNATI, OHIO, ASSIGNOR TO THE TOLEDO ELECTRIC WELDER COMPANY, A CORPORATION OF OHIO.

ELECTRIC WELDING.

1,142,833.  Specification of Letters Patent.  Patented June 15, 1915.

Application filed April 6, 1914. Serial No. 829,780.

*To all whom it may concern:*

Be it known that I, JAMES A. MUIR, a citizen of the United States, residing at Cincinnati, in the county of Hamilton and State of Ohio, have invented certain new and useful Improvements in Electric Welding, of which the following is a full, clear, and exact specification.

My invention relates to an improvement in electric welding, and particularly to an improved method and apparatus whereby the welding is accomplished under different conditions and arrangement of the apparatus to suit the particular character of the work operated upon, and wherein the method and controlling apparatus is adapted for the convenience of the operator under the different conditions.

In a patent granted to R. C. Pierce, May 27, 1913, No. 1,062,728, there is disclosed apparatus whereby a predetermined pressure is applied to the work, after which current is applied automatically for welding the parts and upon increased application of pressure current is automatically cut off; but in other cases the work to be performed by the same machine may require increased pressure beyond the predetermined amount before it is desirable to apply the current, and in other cases it may be desirable to apply current for welding before the predetermined pressure for which the machine is set is exerted.

One object of my invention is to provide a method of control and improved apparatus whereby the same machine may be adapted for and utilized under the different work conditions as they may arise and to secure this result by apparatus simple in construction, and which may be conveniently and easily adapted for the different conditions required.

Another object of my invention is the provision of means whereby a machine may be quickly and conveniently controlled electrically under the various conditions of operation automatically from a plurality of different points conveniently located and controlled either manually under conditions as desired by the operator or controlled automatically under predetermined conditions and also secure simplicity in such control by utilization of a single switch only for the control of the welding current.

Another object of my invention is to secure any desired mode of operation as above described either by hand or foot power.

Other objects and advantages of my invention will be understood by those skilled in the art from the following description and accompanying drawings of one form of my invention.

Figure 1 is a side view, partly broken away of a machine embodying my invention and also illustrating diagrammatically the electric connections in general. Fig. 2 is a detail partly in section illustrating the construction of a portion of the head of the machine; Fig. 3 is a side view of the controlling lever partly in section; and Fig. 4 is a plan view of a portion of the automatic switch mounted on the controlling lever.

Referring to Fig. 1, the main frame is indicated at 1 having the upper horn 2 for supporting and guiding the movable vertical electrode 3, and having the lower horn 4 for supporting the fixed electrode 5. Within the frame is located the transformer 6 of any suitable construction, the secondary being shown of a single turn and having one terminal connected through flexible leads 7 to the movable electrode 3 and the other terminal rigidly connected to the electrode 5 through the horn 4.

The movable electrode 3 is secured to a vertically movable plunger 8 which is supported in the outer frame portion of the horn 2, the plunger 8 being connected by a swivel connection as shown in Fig. 2 to a core piece 9. A link 10 connects the piece 9 to the end of a crank lever 11, which is keyed to the shaft 12, the parts 10 and 11 forming a toggle connection for raising and lowering the movable electrode when the shaft 12 is turned in its bearings. The shaft 12 is mounted in a pedestal 13 which has bearing portions extending within the frame support, the pedestal being held in position by a clamping ring 14, although sufficient clearance is allowed for permitting the pedestal to be turned in its support to any desired position.

A counter-weight 15 is secured to the shaft 12 and tends to normally hold the movable electrode 3 in its upper position. Fixed to the shaft 12 is an operating arm made in three sections, one portion 16 being directly fixed to the shaft 12 and another portion 17 being pivoted at 18 to the section 16. The frame portion of the section 16 is of inverted U-shape and the section 17 is partially located within this U-shaped portion of the frame. On each side of the frame of the section 16 is a depending plate 19 in the lower portions of which is pivotally mounted a clamp 20 having a handle 20'. This clamp is in vertical position as shown in Figs. 1 and 3 of the drawings and mechanically locks the two sections 16 and 17 together, as well shown in Fig. 3. When the handle is in a horizontal position the two sections are separable from each other. Pivotally connected to the section 17 is a bolt 21, which extends up through the end of the section 16 and has an adjustable nut 22 at its upper end for adjusting the tension exerted by the spring 23 located between the nut 22 and the end of the section 16. The spring 23 tends to hold the sections 16 and 17 together, the tension of the spring being adjustable for adaptation to different character of work operated upon. A nut 24 is also adjustable on the bolt 21 for adjustment of the machine and limits the separation of the sections 16 and 17 to a predetermined amount.

An automatic switch is mounted upon the section 16 between protecting plates 25. This consists of two insulated supporting arms 26, each carrying at their upper ends yieldably mounted contacts 27. A movable bridging contact 28 is adapted to engage the yieldable contacts 27 and close the circuit between them. Bridging element 28 is insulated upon the upper end of a pivoted arm 29. The arm 29 is connected by two links 30 to two links 31, the lower ends of which are pivoted on the shaft 32. Two springs 33 are connected to the arm 29 at one end and to a fixed part of the frame at the other end of each spring. These springs tend to hold the switch open normally keeping the bridging element 28 out of contact with the contacts 27. Pivoted to the shaft 32 between the links 31 and 30 is mounted a cylinder 34 containing a piston 35, the upper end of which extends through the cylinder and is notched for receiving a latch 36 pivoted on the rod 37 connecting the links 30 and 31. A rod from the piston 35 extends through the lower end of the cylinder 34 and is connected by a link 38 to the lower section 17, the link 38 passing freely through an opening in the frame of section 16. A spring 39 located between the piston 35 and the lower end of the cylinder tends to force the piston 35 outwardly so as to be engaged by the latch 36. An extension 40 from the cylinder 34 is adapted to have its lower end engage the frame of the section 16.

The outer portion of the section 17 is hollow and of inverted U-shape and within this hollowed portion is pivoted the third section 17' of the lever, being pivoted to the section 17 by the rod 18'. Pivotally connected to the section 17' is a bolt 21', which extends up through the outer end of the section 17 and has an adjustable nut 22' at its upper end for adjusting the tension exerted by the spring 23' located between the nut 22' and the end of the section 17. The spring 23' tends to hold the sections 17 and 17' together in the same manner that the spring 23 tends to hold the sections 16 and 17 together, the tension of the spring in each case being adjustable for adaptation to the character of the work operated upon. An adjustable nut 24' is located upon the bolt 21' for limiting the separation of the sections 17 and 17' to a predetermined amount. This nut 24' may be used for clamping the sections 17, 17' rigidly together by adjusting it to the top of the section 17, but if desired special means for locking the sections 17 and 17' together may be used, such as the clamp 20 which locks the sections 16 and 17 together when desired. The nut 24 may likewise be used for locking the sections 16 and 17 together if desired.

Mounted upon the section 17' is a support 41 which in turn supports a yieldably mounted contact 42, the support for this contact being insulated from the support 41. A movable contact 43 adapted to engage the contact 42, is supported by and insulated from an arm 44 pivoted to the section 17' at 45 and having a lower extension to the end of which is pivotally connected a rod 46, which extends out through the handle 47 of section 17' and to the finger button 48. It is obvious that when the knob or button 48 is pressed inwardly by the operator, the contact 43 will be forced against the pressure of the spring 49, which normally holds the switch open and will be caused to engage the contact 42 and so close a circuit between them.

Upon the horn 2, a rod 49 is adjustably fixed carrying a small frame 51 upon which is mounted a yieldable contact 52, its support being insulated from the frame 51 as indicated in the drawing. The arrangement is similar to the mounting of contact 42. Contact 53 is insulated from and carried at the upper end of an arm 54, the arm 54 being pivoted on the frame 51 and having a lower extension to the lower end of which is pivotally connected a push-rod 55 extending toward the front of the machine through the frame 51 and having an operating finger button or knob 56 at its outer end. The arrangement is generally similar to corresponding parts mounted upon the outer end of the section 17' already described and it is obvious that when the operator pushes the knob 56 inwardly, the contact 53 will engage the contact 52 and close the circuit between them.

Upon the lower surface of the arm 17' is mounted an insulated bracket, which supports a yieldable contact 42' adapted to engage an insulated fixed contact 43' mounted upon the lower portion of the section 17 so that when the section 17' is moved downwardly on its pivot relatively to the section 17, connection is closed between the contacts 42' and 43'. Upon the side of the outer end of the section 17 is mounted a manual knife-blade switch 80 shown in Fig. 1 as movable sidewise for clearness in showing the connections.

The mains 57 are adapted to be connected to a source of alternating current for supplying energy to the transformer which in turn furnishes the welding current from its secondary to the electrodes of the machine. Between the source of energy and the connections to the primary of the transformer is located an automatically closable switch which may be of any suitable form and is indicated diagrammatically in Fig. 1 as having a winding 58 adapted to attract or raise its core 59, the lower end of which carries two insulated bridging elements 60 adapted to engage the fixed contacts above them when the core 59 is raised and so close the circuit to the primary of the transformer. The operating coil 58 of the automatic switch has one lead 61 extending to a suitable source of energy and the other lead 62 from the coil together with a lead 63 from the source extend to the above described switches, each of these switches being connected in parallel to these leads, excepting the switch made up of the contacts 42' and 43', which switch when closed is in series with relation to all of the other three switches, which three are in parallel relation with each other, the manual switch 80 when closed being adapted to short-circuit the switch comprising the contacts 42' and 43', and so nullifying the effect of the latter switch upon the circuits of the remaining coil controlling switches. Thus the lead 63 from the source passes directly to contact 43' and when this contact is engaged by the contact 42' the circuit is closed to leads extending to the automatic switch mounted on section 16, the manually operated switch mounted on section 17' and the manually operated switch mounted on the horn 2 of the machine in parallel, the circuit from each of these three switches when closed passing to the lead 62 which extends to the controlling coil 58 of the main switch. When the switch comprising the contacts 42' and 43' or the switch 80 is closed, then the closure of any one of the remaining three controlling switches will close the circuit through the controlling coil 58 and thereby cause the closure of the main switch. The opening of the switch having contacts 42', 43' when switch 80 is open will cause the opening of the circuit through the controlling coil 58 even though any one of the remaining three control switches may remain closed and so cause the opening of the main switch. If the switch having contacts 42', 43' or the switch 80 remain closed, then if the remaining three controlling switches be in open circuit position, the circuit through the coil 58 will be broken and the main switch open.

In some cases where the voltage of the energy supplied to the transformer is comparatively low, the leads 61 and 63 may be connected directly to the source of the welding energy, and in other cases it may be desirable to connect the leads 61, 63 to mains of lower voltage than that applied to the welding transformer.

As above stated, the welding machine may be operated by hand, but the machine is also adapted to be operated by foot. For this purpose there is shown a foot lever 64, pivoted at 65 and having an extended portion 66, which may be weighted as shown, if desired. A link 67 is connected to a portion 66 of the foot lever and to one end of another lever 68 pivoted at 69. A rod 70 is pivotally connected to the upper end of the lever 68 and is provided at its upper end with a clamp 71 adapted to be clamped about and engage a recessed portion 72 at the outer end of the handle of the hand-lever.

In operation, for certain classes of work, the handle 20' will be moved to a position parallel with the hand lever so as to unlock the sections 16 and 17 and permit relative movement between them. The nut 24' will be moved down on the bolt 21' to lock the sections 17 and 17' together. The switch 80 will be moved to closed position. The tension of the spring 23 will be adjusted to suit the pressure required upon the work between the electrodes of the machine and if the operator desires to work the machine by hand, assuming the work to be placed between the electrodes, the operator will pull down on the handle of the section 17'. This separates the sections 16 and 17 against the pressure of the spring 23. In the separation of the two sections 16 and 17, the link 38 will tend to draw the piston 35 against the pressure of a spring 39, but the relative tension of the springs 39 and 33 are such that during the initial separation of the sections the cylinder 34 will be turned upon its pivot until the extension 40 approaches the frame of the section 16, thus causing the bridging element 28 to engage the contacts 27 and so close the circuit through the controlling coil 58 of the automatic switch. The excitation of this coil by closure of the main switch, causes welding current to be applied to the work between the electrodes. It will be noted that the welding current is thus supplied to the work only when the pressure exerted between the electrodes through the operating levers has reached a predetermined amount, at which time the automatic switch controlling current to the welding transformer is closed. A further exertion of pressure upon the handle 47, after the extension 40 strikes against the frame of the section 16, next causes the piston 35 to be drawn within the cylinder 34 against the pressure of the spring 39, and so releases the latch 36, which action permits the springs 33 to separate the bridging element 28 from its contacts and so open the circuit of the controlling coil 58, and cut off the welding current by the automatic opening of the main switch. The welding is then completed and when it is desired to make another similar weld the operator releases the handle 47 and the spring 23 causes the two sections of the operating lever to be brought together in position for the next operation. The union of the two sections of the operating lever of course causes the cylinder 34 to be rotated to the left upon its pivot when the latch 36 will again engage the notch in the piston 35 in preparation for the next operation.

In some classes of work it will be desired to put the control of the pressure exerted between the electrodes and the time of applying the welding current within the control of the operator. In such a case the handle 20' will be moved to the position shown in the drawings so as to securely lock together the two sections 16 and 17 of the operating lever. This of course will prevent the operation of the automatic switch carried by the section 16. The nut 24' will be moved upwardly on the bolt 21' to a position that will permit a predetermined maximum amount of separation between the sections 17' and 17 when the handle is pulled downwardly. The switch 80 will be thrown to open position. Under such circumstances, assuming the work to be in place between the electrodes, the operator will pull down upon the handle 47, and by reason of its freedom of movement relatively to the section 17, the contact 42' will be brought in engagement with the contact 43', but this does not close the circuit through the controlling coil 58. Continued downward movement of the handle 47 will then cause the sections 16 and 17 to be moved as a unit and cause the electrodes to be brought against the work to be operated upon. Any desired pressure upon the work may now be exerted by the operator. When the desired pressure upon the work is obtained, the operator will press the button 48 which will close the contacts 42, 43, which by reason of the contacts 42', 43' being closed, will complete the circuit through the controlling coil 58 and thereby close the main automatic switch for supplying the welding current. As soon as the weld is completed and the handle 47 released, the section 17' will be drawn by the springs 23' against the section 17 which action opens the circuit between contacts 42' and 43'. This results in automatically opening the circuit through the controlling coil 58, and so automatically opens the main automatic switch even though the operator still keeps the contacts 42, 43 closed by pressing upon the button 48. It is therefore seen that the automatic operation of the contacts 42' 43' results in automatically cutting off the welding current as soon as or even before pressure upon the work ceases. It is also apparent that when the switch 80 is open the welding current cannot be passed through the electrodes of the machine unless the handle 47 is depressed relatively to the section 17 of the operating lever. This prevents improper application of welding current by the operator and also insures a prompt cutting off of the welding current before or at the time the pressure exerted by the electrodes is released.

Of course the tension of the spring 23' may be adjusted to suit special requirements and in some cases it may be desirable to adjust the tension of this spring to insure the application of sufficient pressure upon the work by the movement of the operating lever as a whole before the contact 42' is brought into engagement with the contact 43'. In such case even though the operator should hold the contact 43 in engagement with contact 42, the welding current would not be applied until the contact 42' is brought into engagement with contact 43'. In such a case the welding current would of course be cut off as soon as the contacts 42' and 43' separate, even though the operator continues to press upon the button 48.

As above stated the machine may be operated by foot and in such case the hand lever will be swung around in its bearing above described, toward the rear of the machine and the upper end of the rod 70 will be secured by means of a clamp 71 to the outer end of the handle 47 in the recess 72. If the work is of a character as to require the carrying out of a series of operations in which the pressure is to be applied to a predetermined amount, at which time the welding current is to be applied, the handle 20' will be moved to unlock the two sections 16, 17, and the nut 24' will be moved to lock lever sections 17 and 17' together and the switch 80 will be closed. The operation of the automatic switch carried upon the handle lever and other parts of the apparatus will then be substantially the same as above described, when the foot lever 64 is depressed.

If the nature of the work is such as to make it desirable to put the control of the pressure and the time of application of the welding current within the control of the operator when the foot lever 64 is used, the handle 20' will be moved to lock together the two sections 16, 17 of the handle lever. The nut 24' will be moved to a position upon the bolt 21' which will allow a predetermined separation of the lever sections 17 and 17' and the switch 80 will be opened. After the work is in place the operator will depress foot lever 64 to cause the pressure exerted upon the work to be the amount desired for the welding, and the operator will then push the button 56 inwardly and close contacts 52, 53, which will cause the excitation of the controlling coil 58 and the closing of the main switch for applying the welding current, the contact 42' having been brought against contact 43' previously by reason of relative movement between the sections 17' and 17. When the weld is complete, the release of the foot lever will permit section 17' to be forced against section 17 and so separate the contacts 42', 43' which will result in cutting off the welding current, even though the operator might inadvertently continue to press upon the button 56. This operation is similar to the corresponding operation above described and the tension of the spring 23' may be adjusted as above explained to suit the particular requirements.

It is apparent that the method of control and the apparatus above described secures a large range of flexibility and convenience in the operation of the machine and in its adaptation to work of different nature and of different requirements.

Although I have disclosed one embodiment of my invention, it will be understood that various modifications may be made without departing from the scope of my invention.

Having thus described my invention, what I declare as new, and desire to secure by Letters Patent of the United States is:—

1. In an electric welding machine, an automatic switch for controlling the supply of welding current, an operating lever for the machine, automatic means functionally related to said lever for controlling the closure of said switch, and means for rendering said automatic means ineffective.

2. In an electric welding machine, the combination of an operating lever, automatic controlling means controlled by the operation of said lever for supplying welding current, means for rendering the automatic control ineffective, and additional means for controlling the supply of welding current at the will of the operator.

3. In an electric welding machine, the combination of an automatic switch for controlling the welding current, an operating hand lever for the machine, means for controlling the closure of said automatic switch when said lever is operated by hand, means for operating the machine by foot, and additional means for controlling the closure of said automatic switch when the machine is operated by foot.

4. In an electric welding machine, the combination of an operating lever, means controlled by the movement of said lever for automatically controlling the welding current, means for rendering said control ineffective, and additional means for controlling the welding current at the will of the operator.

5. In an electric welding machine, a main switch for supplying the welding current, electromagnetic means for operating said switch, means for applying pressure upon the work between the electrodes, and automatic controlling means controlling said electromagnetic means and controlled by said means for applying pressure for insuring the interruption of the welding current at said main switch upon release of said pressure.

6. In an electric welding machine, an operating element for controlling the pressure exerted upon the work by the electrodes of the machine, a main switch for supplying the welding current, electromagnetic means for operating said switch, and means controlled by said element and controlling said electromagnetic means for insuring the interruption of the welding current at said main switch upon the release of pressure exerted upon the work.

7. In an electric welding machine, a switch for controlling the supply of welding current, means for exerting pressure on the work between the electrodes, manually controlled means for controlling the closure of said switch at the will of the operator, and automatic means for insuring the opening of said switch upon the release of said pressure.

8. In an electric welding machine, an element for applying pressure upon the work between the electrodes, automatic means for applying welding current upon predetermined increase of pressure and for interrupting the welding current upon further increase of pressure, means for rendering said automatic means ineffective, a controlling device for causing the supply of welding current at the will of the operator, and automatic controlling means for interrupting the supply of welding current upon decrease of pressure between the electrodes.

9. In an electric welding machine, an element for applying pressure upon the work between the electrodes, manually controlled means for supplying the welding current, said means being controllable by the operator independently of the application of pressure by said element upon the work, and protective means for preventing the supply of welding current until a predetermined pressure has been exerted upon the work.

10. In an electric welding machine, an element for applying pressure upon the work between the electrodes, manually controlled means for supplying the welding current, said means being controllable by the operator independently of the application of pressure by said element upon the work, and automatic protective means for preventing the supply of welding current before a predetermined pressure has been exerted upon the work and for insuring the interruption of the welding current upon the reduction of said pressure.

11. In an electric welding machine, an element for exerting pressure upon the work between the electrodes, automatic controlling means for supplying and interrupting the welding current upon operation of said element, means for rendering said automatic means ineffective in controlling the welding current, a manual device for controlling the welding current at the will of the operator, automatic protective means for rendering ineffective said manual device except under predetermined conditions, and means for rendering said automatic protective means ineffective while said automatic controlling means is rendered effective.

12. In an electric welding machine, an element for exerting pressure upon the work between the electrodes, a main switch for controlling the welding current, manually operated means for automatically controlling the closure and opening of said switch, and automatic protective means for permitting the control by said manual means to be effective only under predetermined conditions.

13. In an electric welding machine, an operating lever for applying pressure upon the work and for automatically controlling the supply of welding current, means for rendering the automatic control of the welding current by said lever ineffective, and additional manually controlled means carried by said lever for controlling the supply of welding current at the will of the operator.

14. In an electric welding machine, an operating lever for applying pressure upon the work, said lever being in sections movable relatively to each other, automatic means for controlling the supply of welding current operated by relative movement of the sections of said lever, means for locking said sections together for rendering the operation of said controlling means by relative movement of said sections ineffective, and additional means for controlling the supply of welding current at the will of the operator.

15. In an electric welding machine, an operating lever for applying pressure to the work, said lever being composed of sections, manually controlled means carried by said lever for controlling the supply of welding current at the will of the operator, and means controlled by relative movement between the sections of said lever for preventing said manually controlled means from being effective except under proper relationship of the electrodes of the machine to the work.

16. In an electric welding machine, an operating lever for applying pressure to the work, said lever being sectional, means for controlling the supply of welding current, said means comprising a manually operable switch carried by said machine and a second switch in series with said first named switch, said second switch being closed and opened by relative movement between the sections of said lever.

17. In an electric welding machine, an operating lever for applying pressure to the work, said lever being sectional, and means for controlling the supply of welding current, said means comprising a manually operable switch carried by said lever and a second switch in series with said first named switch, said second switch being closed and opened by relative movement between the sections of said lever.

18. In an electric welding machine, an operating lever for applying the electrodes to the work, an automatic main switch controlling the supply of welding current, a master switch operated by movement of said lever, and a third switch in series with said master switch for controlling the movement of said main switch.

19. In an electric welding machine, an operating lever for applying the electrodes to the work, an automatic main switch controlling the supply of welding current, a master switch operated by movement of said lever, and a plurality of switches controllable at a plurality of different points respectively and in series with said master switch for independently controlling said main switch.

In testimony whereof I affix my signature, in presence of two witnesses.

JAS. A. MUIR.

Witnesses:
NEIL MACNEALE,
ANNA M. WALSH.